(12) United States Patent
Miyamoto

(10) Patent No.: US 7,409,399 B2
(45) Date of Patent: Aug. 5, 2008

(54) INFORMATION PROCESSING APPARATUS, INFORMATION PROCESSING METHOD, AND PROGRAM

(75) Inventor: Toshihiro Miyamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 542 days.

(21) Appl. No.: 11/038,114

(22) Filed: Jan. 21, 2005

(65) Prior Publication Data

US 2005/0166000 A1    Jul. 28, 2005

(30) Foreign Application Priority Data

Jan. 23, 2004  (JP) ............................. 2004-015945
Jan. 17, 2005  (JP) ............................. 2005-009238

(51) Int. Cl.
*G06F 7/00* (2006.01)

(52) U.S. Cl. ..................... 707/100; 386/125; 386/95; 715/723

(58) Field of Classification Search ................. 707/100
See application file for complete search history.

(56) References Cited

U.S. PATENT DOCUMENTS

| | | | |
|---|---|---|---|
| 5,530,821 A | | 6/1996 | Miyamoto ................. 395/413 |
| 6,035,367 A | * | 3/2000 | Laws .......................... 711/100 |
| 6,678,469 B1 | * | 1/2004 | Minemura et al. .......... 386/125 |
| 2002/0114617 A1 | * | 8/2002 | Ando et al. ................... 386/95 |
| 2004/0261027 A1 | * | 12/2004 | Dillon et al. ................ 715/723 |
| 2006/0048669 A1 | * | 3/2006 | Kinno et al. ................ 104/100 |

* cited by examiner

*Primary Examiner*—Don Wong
*Assistant Examiner*—Binh V Ho
(74) *Attorney, Agent, or Firm*—Fitzpatrick, Cella, Harper & Scinto

(57) ABSTRACT

A data processing apparatus stores continuous area management information which associates head position information of each continuous area on the storage medium with a continuous size thereof. The data processing apparatus specifies position information of a data read position corresponding to a specific position with reference to the continuous area management information in response to a data read request from the specific position in information data, and reads out some or all of the information data from a read position on the storage medium corresponding to the specified position information.

6 Claims, 21 Drawing Sheets

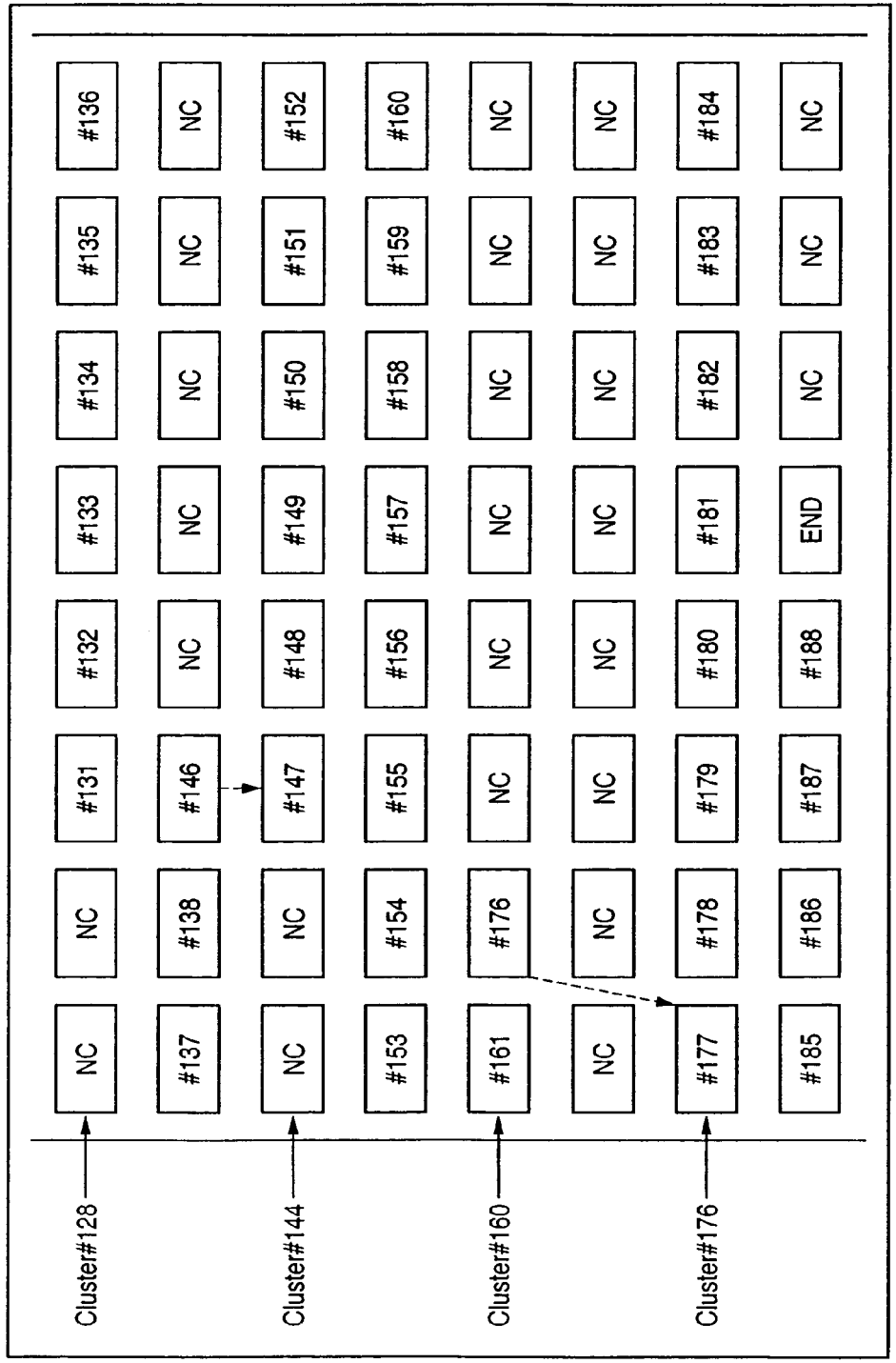

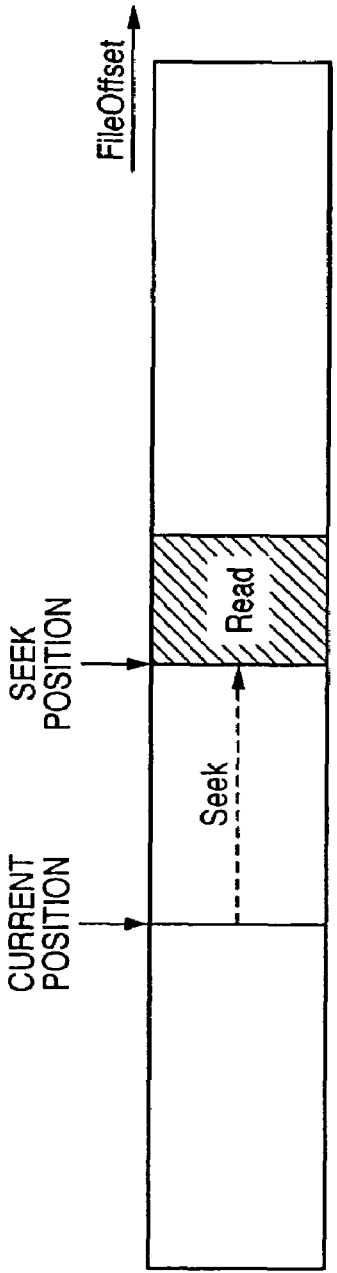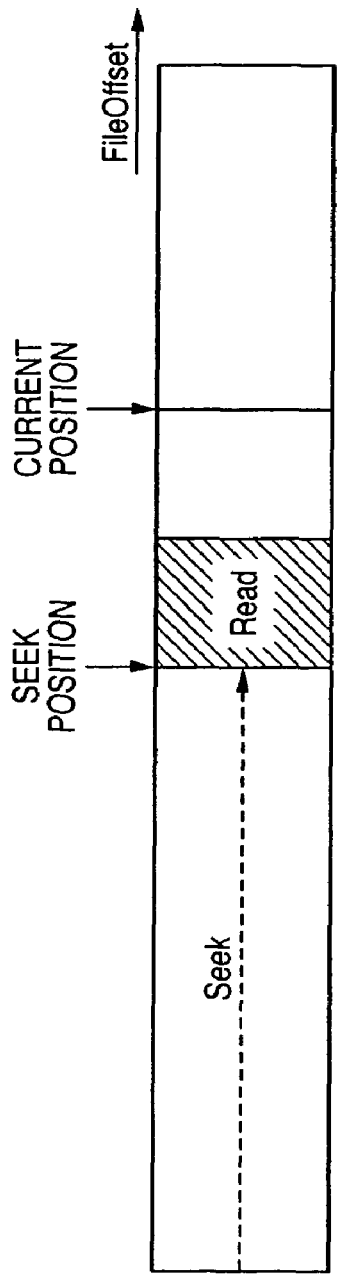

FIG. 4B

```
typedef struct {
        int    Position;
        int    Size;
} ClusterInfo[N];

WHEN REQUESTED FileOffset IS TO BE SOUGHT, int RemainOffset=FileOffset;
for(i=0; i<N; i++){
        if( (A*ClusterInfo[i].Size)>RemainOffset){
                StartCluster=ClusterInfo[i].Position+(RemainOffset/A);
                StartOffset=RemainOffset % A;
                break;
        }
        RemainOffset-=A*ClusterInfo[i].Size;
}

OBTAIN CALCULATION RESULT (StartCluster, StartOffset) AS:
```

FIG. 5B

```
typedef struct {
        int    Position;
        int    Size;
} FRAGMENTED_CLUSTER;

typedef struct {
        FRAGMENTED_CLUSTER Cluster[N];
        int                       TotalClustersBefore;
        int                       TotalClustersIn;
} Info;

WHEN REQUESTED FileOffset IS TO BE SOUGHT, int OffsetCluster=FileOffset/A;
if( (OffsetCluster<Info.TotalClustersBefore) ||
   ((Info.TotalClustersBefore+Info.TotalClustersIn) <=OffsetCluster){
    Build_ClusterInfo(OffsetCluster, &Info);
}

N NEED NOT BE ASSURED FOR SEGMENTED BLOCKS IF Info
(SEGMENTED BLOCK INFORMATION) IS UPDATED, int RemainOffset=FileOffset-(A*Info.TotalClustersBefore);
for(i=0; i<N; i++){
        if( (A*Info.Cluster[i].Size)>RemainOffset){
             StartCluster=Info.TotalClustersBefore
                          +Info.Cluster[i].Position+(RemainOffset/A);
             StartOffset=RemainOffset % A;
             break;
        }
        RemainOffset-=A*ClusterInfo[i].Size;
}

OBTAIN CALCULATION RESULT (StartCluster, StartOffset) AS:
```

FIG. 6C

```
typedef struct {
        int   SeekPoint;
        int   Position;
} ClusterInfo[N];

WHEN REQUESTED FileOffset IS TO BE SOUGHT, int index=N-1;
while(1){
        if(ClusterInfo[index]. SeekPoint<=FileOffset){
                CurrentCluster=ClusterInfo[index].Position;
                CurrentOffset=0;
                break;
        }
        index--;
}

OBTAIN CALCULATION RESULT (CurrentCluster, CurrentOffset) AS:
```

INFORMATION PROCESSING APPARATUS, INFORMATION PROCESSING METHOD, AND PROGRAM

FIELD OF THE INVENTION

The present invention relates to an information processing apparatus, information processing method, and program, which read out data by seeking a target data position on a file in a file system (e.g., FAT file system) that allows to seek used cluster information in only the forward direction.

BACKGROUND OF THE INVENTION

Conventionally, a data processing apparatus which allows the user to easily recognize the contents of still images and the like and to easily manage files of still images and the like upon playing back still images, motion images, and audio stored in a storage medium using a memory card having a solid memory element as the storage medium is known. A digital still camera or the like can play back not only data sensed/stored by itself but also data stored by another data processing apparatus, as long as data is stored on a compatible storage medium.

Such data processing apparatus can load and play back data from a detachable non-volatile memory. Even when a non-volatile memory is built in and is not detachable, another data processing apparatus is connected to store and save data there, and the saved data can be loaded and played back.

In case of a digital still camera or the like, not only data obtained by another data processing apparatus but also image data obtained by photoelectrically converting an optical image photographed by a photographing lens by a photoelectric conversion element, and audio data obtained by A/D converting an audio signal stored via a microphone are temporarily saved in a volatile memory, and the image and audio data are transferred to and saved in a storage medium. Also, playback is made by transferring the image and audio data from the storage medium to the volatile memory.

However, such conventional data processing apparatus adopts a file system (e.g., FAT (File Allocation Table) file system or the like) that seeks and plays back a target file by seek unit that seeks used cluster information in only the forward direction. In the data processing apparatus with such file system, when a playback process is done by randomly accessing data by quick forward scan or reverse scan, a seek time required to access the target data position becomes less negligible with increasing file size, thus imposing stress on the user.

SUMMARY OF THE INVENTION

The present invention has been made in consideration of the above situation, and has as its object to provide an information processing apparatus, information processing method, and program, which can shorten the seek time required to access a file stored in a storage medium.

An information processing apparatus according to one aspect of the present invention is directed to an information processing apparatus for processing a series of information data divisionally recorded on a plurality of continuous areas on a storage medium, comprising, storage unit for storing continuous area management information that associates head position information of each continuous area on the storage medium with a size thereof, position information specifying unit for specifying position information of a data read position corresponding to a specific position with reference to the continuous area management information stored in the storage unit in response to a data read request from the specific position in the information data and data read unit for reading out some or all of the information data from the read position on the storage medium in accordance with the position information specified by the position information specifying unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 shows an example of management of the cluster use state shown in FIG. 1 in a file system;

FIG. 3A shows a seek method when a seek position is located in the forward direction with respect to the current position in the cluster management example shown in FIG. 2;

FIG. 3B shows a seek method when a seek position is located in the reverse direction with respect to the current position in the cluster management example shown in FIG. 2;

FIG. 4B shows an example of a program that executes a seek process according to the first embodiment of the present invention;

FIG. 5B shows an example of a program that executes a seek process according to the second embodiment of the present invention;

FIG. 6C shows an example of a program of a process for specifying a seek start position according to the third embodiment of the present invention;

DETAILED DESCRIPTION OF THE PREFERRED EMBODIMENTS

Preferred embodiments of the present invention will now be described in detail in accordance with the accompanying drawings.

First Embodiment

Figure 15:
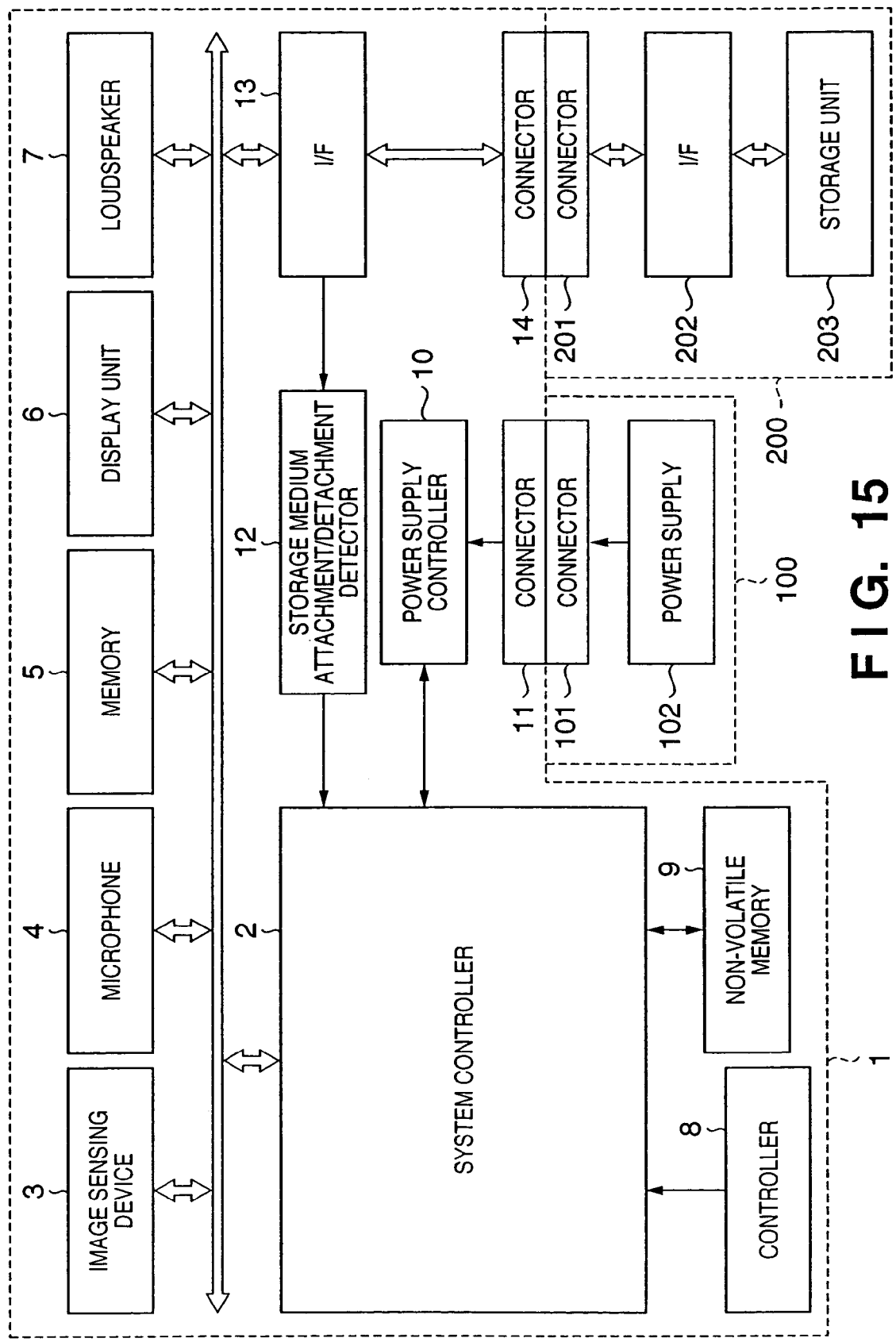
FIG. 15 is a schematic block diagram showing the arrangement of a data processing apparatus according to an embodiment of the present invention.

A schematic arrangement of a data processing apparatus (information processing apparatus) according to the first embodiment of the present invention will be described first. FIG. 15 is a schematic block diagram showing the arrangement of the data processing apparatus according to the first embodiment of the present invention. Note that the data processing apparatus of this embodiment is a video camera which includes a compact, detachable hard disk as a storage medium.

Referring to FIG. 15, reference numeral 1 denotes a data processing apparatus (video camera) which has a function of storing sensed video data on a storage medium 200 (to be described later), and a function of playing back video data stored in the storage medium 200. Reference numeral 100 denotes a detachable power supply (battery), which serves as a power supply of the data processing apparatus 1. Reference numeral 200 denotes a detachable storage medium (=nonvolatile memory), which has a structure in which a target cluster (track) is accessed by setting an address by the data processing apparatus 1, and is a compact hard disk in this embodiment.

Reference numeral 2 denotes a system controller, which controls respective processors in the data processing apparatus 1, the flow of data, and the like. Reference numeral 3 denotes an image sensing device which A/D (analog/digital) converts a sensed image signal obtained by photoelectrically converting an object image, and outputs image data. Reference numeral 4 denotes a microphone which A/D-converts a sound signal obtained by converting a sound into an electrical signal, and outputs audio data. Reference numeral 5 denotes a memory which has a work area for storing the acquired image data, audio data, segmented block information, and seek start position information, also a program required to execute a seek process, and the like, and comprises a volatile memory such as a RAM or the like. Reference numeral 6 denotes a display unit which displays a playback video picture or a video picture which is being sensed by the image sensing device 3. Reference numeral 7 denotes a loudspeaker which plays back audio data.

Reference numeral 8 denotes a controller comprising operation buttons and the like, which are used by the user to input instructions to the data processing apparatus. Reference numeral 9 denotes a non-volatile memory which can keep holding data even when power supply is cut off. Reference numeral 10 denotes a power supply controller which controls the power supply 100 connected via a connector 11. Reference numeral 11 denotes a power supply connector, which can be connected to a connector 101 of the detachable power supply 100.

Reference numeral 12 denotes a detector which detects attachment/detachment of the detachable storage medium 200. Reference numeral 13 denotes an interface unit which exchanges data with the storage medium 200. Reference numeral 14 denotes a connector which has a structure that can be connected to the detachable storage medium 200.

Reference numeral 101 denotes a connector of the detachable power supply 100, which is connected to the data processing apparatus 1. Reference numeral 102 denotes a power supply unit of the power supply 100, which can supply electric power to the data processing apparatus 1 via the connector 101. Reference numeral 201 denotes a connector of the detachable storage medium 200, which is connected to the data processing apparatus 1. Reference numeral 202 denotes an interface unit of the storage medium 2000, which exchanges data with the data processing apparatus 1. Reference numeral 203 denotes a storage unit of the storage medium 200, which stores data. Note that the storage unit 203 of the storage medium 200 in this embodiment is a nonvolatile memory which keeps holding data even after power supply is cut off.

Figure 1:
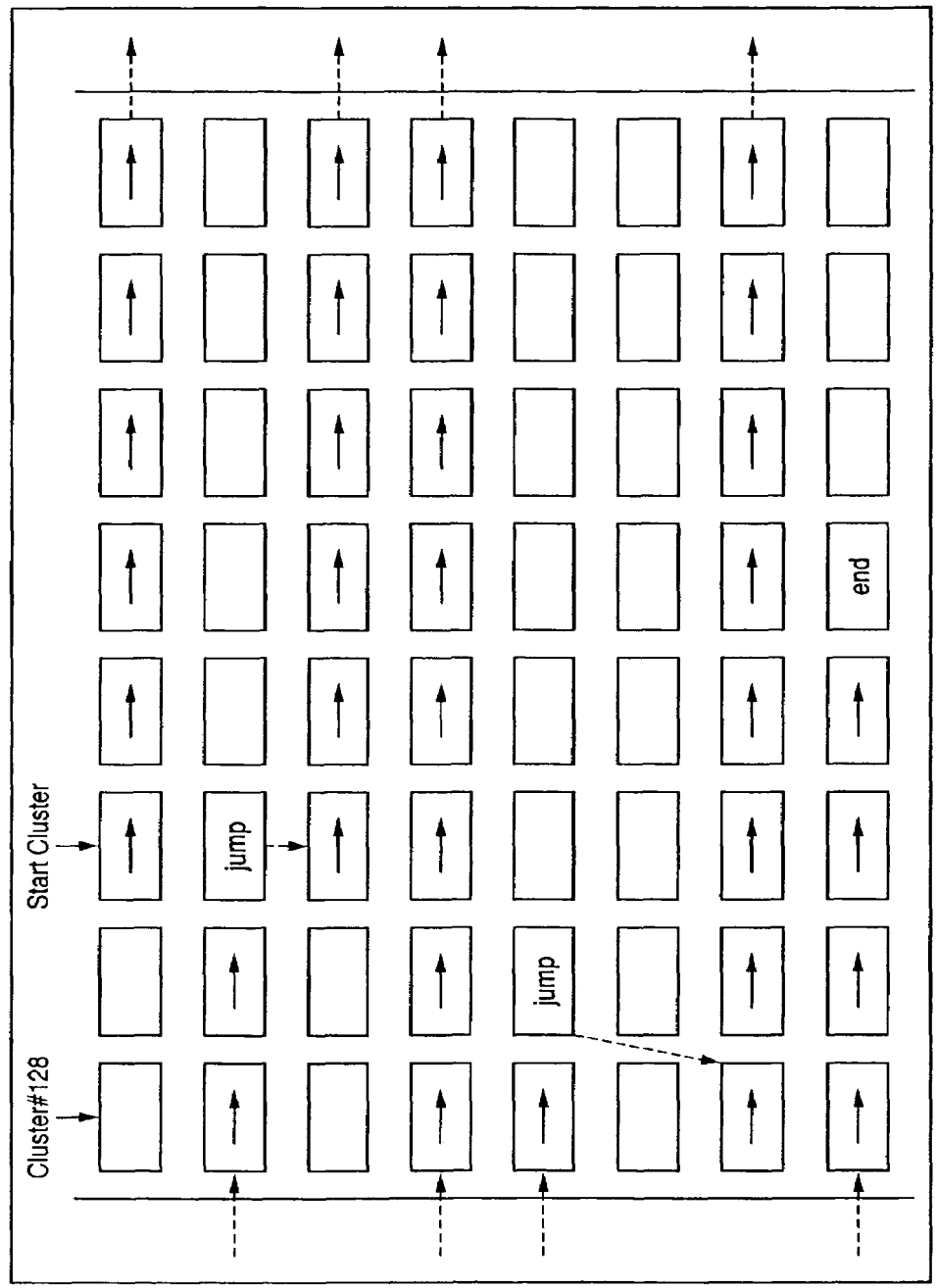
FIG. 1 shows an example of the use state of clusters of a file stored in a storage medium.

FIG. 1 shows an example of the use state of clusters of a given file. As shown in FIG. 1, even in one file, clusters are not always used continuously but may be used discontinuously (intermittently). In FIG. 1, the number of a cluster at the upper left end is #128, that of its right neighboring cluster is #129, and that of its right neighboring cluster is #130, . . . , and clusters are arranged in the order of numbers. A cluster at the rightmost end is followed by the number of a cluster at the left end in one row below. In FIG. 1, clusters with an arrow "→" and characters "jump" and "end" are used clusters, and clusters #130 to #138, #146 to #161, and #176 to #188 are used.

FIG. 2 shows an example of how to manage the cluster use state shown in FIG. 1 in a file system. Note that the management example shown in FIG. 2 uses a FAT file system as a file system. Each individual cluster has as information the number of the next cluster that stores data of a file. For example, cluster #130 holds #131 as the number of the next cluster that stores data of a file in FIG. 2. In this way, each used cluster has number information of the next used cluster, but does not have any number information of a preceding used cluster. Therefore, when a file undergoes a seek process by tracing used clusters so as to access a specific location of the file, the seek process can be done in the forward direction but cannot be done in the reverse direction. In FIG. 2, NC is short for "Not Care", and indicates clusters which are not related to the aforementioned file.

FIGS. 3A and 3B show the conventional seek method when the FAT file system shown in FIG. 2 is adopted. As shown in FIG. 3A, when a seek position is located behind the current position (forward direction), seek can be started from the current position. However, when a seek position is located before the current position (reverse direction), seek must be started from the head of the file, as shown in FIG. 3B. This is because no information required to go back is prepared, and this results in a long seek time.

A generation method and use method of segmented block information in the data processing apparatus 1 of this embodiment will be described below. Note that the segmented block information is information associated with the head cluster number of each segmented block and the number of used clusters included in that block when a file is segmented into segmented blocks to have continuous used clusters as a unit.

In other words, the segmented block information manages the head position information of each continuous area and a continuous size in each continuous area in association with each other as continuous area management information for a series of information data, which are divisionally recorded on a plurality of continuous areas on the storage medium.

Figure 4A:
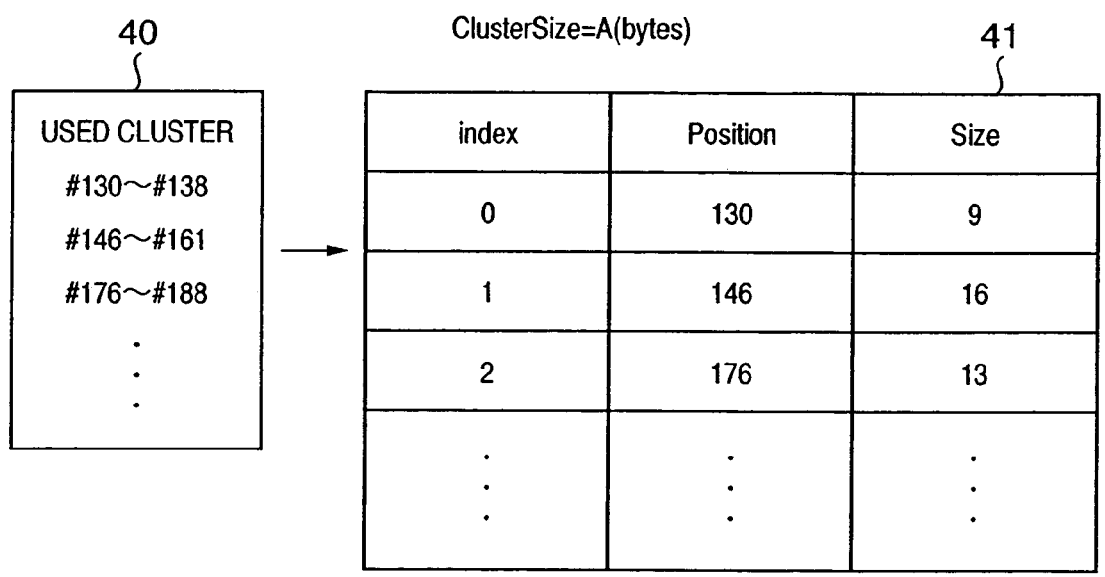
FIG. 4A shows a configuration example of segmented block information according to the first embodiment of the present invention.

FIG. 4A shows an example of the segmented block information according to used clusters. When clusters #130 to #138, #146 to #161, and #176 to #188 are used, as shown in a used cluster state 40 in FIG. 4A, segmented block information 41 is constructed. The segmented block information 41 stores position information "Position" that specifies the position of each segmented block, and the number of the head used cluster of the block in association with an identification number "index" that identifies that segmented block. Also, the information 41 stores the number of continuous used clusters as size information "Size" of the segmented block. Note that the data size of each cluster in this embodiment is A (bytes).

A processing method (first processing method) as a characteristic feature of this embodiment that shortens the seek time by exploiting the segmented block information shown in FIG. 4A will be explained below.

Figure 4C:
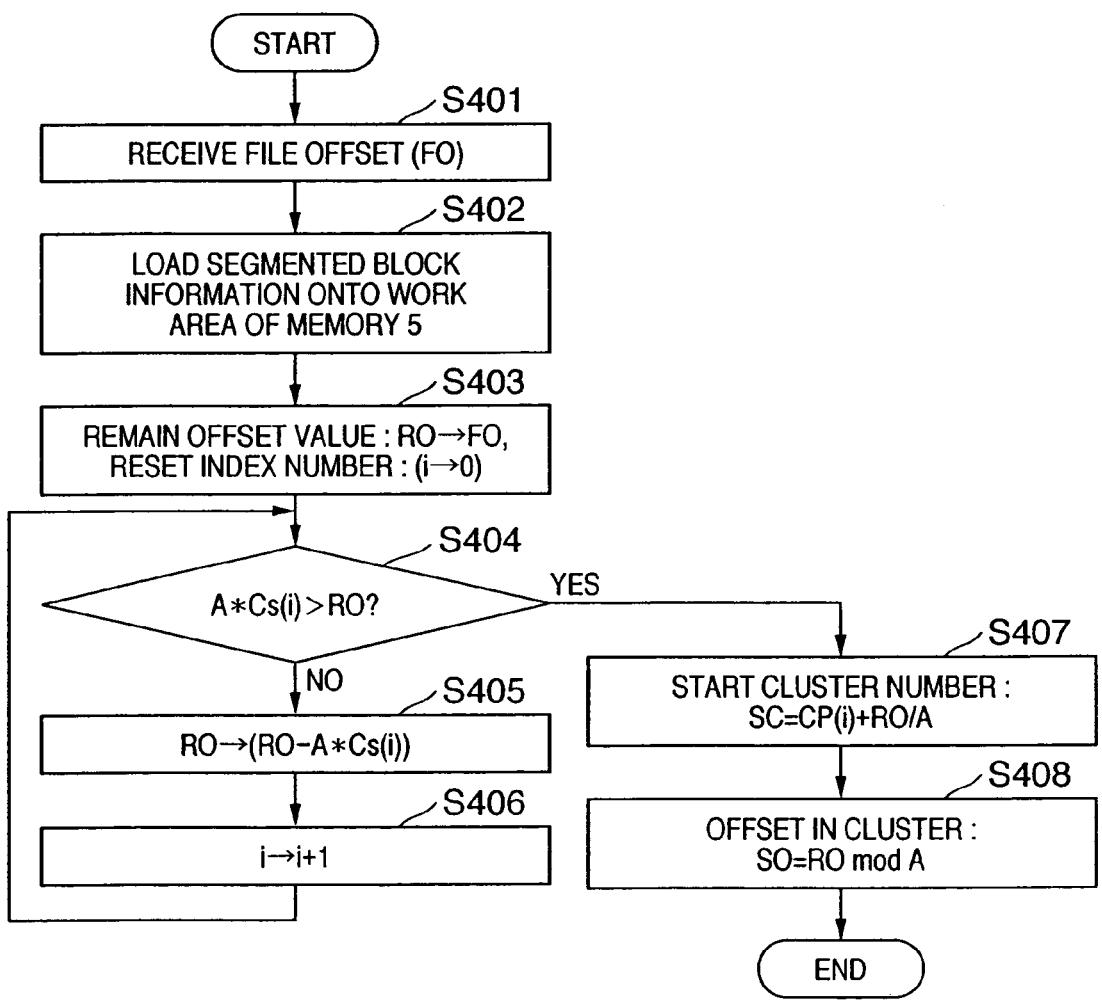
FIG. 4C is a flowchart of the seek process according to the first embodiment of the present invention.

FIG. 4B is a view for explaining a program that implements a seek process using the segmented block information shown in FIG. 4A. As shown in FIG. 4B, the data processing apparatus 1 executes a process for seeking a requested position (FileOffset: indicating the data size from the head of a file to that position) in the file using the position information "Position" and size information "Size" shown in FIG. 4A as variables. Note that variable i in FIG. 4B is a variable indicating the value of the index number "index" of the segmented block information shown in FIG. 4A, and variable A therein is the data size of each cluster. FIG. 4C is a flowchart of the process upon executing the program shown in FIG. 4B.

More specifically, a file offset (FO) is received from the user (S401). The segmented block information 41 shown in FIG. 4A is loaded onto the work area of the memory 5 (S402).

Furthermore, the file offset is set in the value of a remain offset (RO), and a parameter: i indicating the index number in the segmented block information 41 is reset to zero (S403). Note that RO indicates a value obtained by subtracting the data size of the compared segmented block from the file offset. Therefore, since comparison with the data size of the segmented block is not performed in step S403, a size equal to that of the file offset is set.

RO is compared with the data size of the i-th segmented block (S404). The data size of the i-th segmented block is given by $A*Cs(i)$ (where A is the data size per cluster, and $Cs(i)$ is the number of used clusters included in the i-th segmented block). The number of used clusters is $Cs(i)=9$ when $i=0$ according to the segmented block information 41 shown in FIG. 4A.

If $RO \geq A*Cs(i)$ as a result of comparison in step S404 ("NO" in step S404), the flow advances to step S405; if $RO<A*Cs(i)$ ("YES" in step S404), the flow advances to step S407. Note that $RO \geq A*Cs(i)$ means that no cluster including data to be accessed is present in the segmented block to be compared. On the other hand, $RO<A*Cs(i)$ means that a cluster including data to be accessed is present in the segmented block to be compared.

If $RO \geq A*Cs(i)$, the data size of the i-th segmented block is subtracted from RO to update RO (S405), and the number i of the segmented block is incremented by 1 (S406).

On the other hand, if $RO<A*Cs(i)$, the number: SC of a cluster (start cluster) including data to be accessed in the segmented block of interest is calculated as a value ($SC=Cp(i)+RO/A$) obtained by adding the position information ($Cp(i)$) of the head used cluster of the i-th segmented block and the quotient (RO/A: integer value) obtained by dividing RO by the data size per cluster (S407).

Next, an offset (SO) of the data to be accessed in the start cluster is calculated as the remainder ($SO=RO \bmod A$) obtained upon dividing RO by A (S408).

With the aforementioned process, the data processing apparatus 1 can seek the requested position in the file without seeking used cluster information in turn. As a result, the apparatus need not seek the used cluster information in turn irrespective of the seek position, and the seek time can be shortened.

Second Embodiment

A processing method (second processing method) to be executed when the segmented block information exceeds the size of an area that stores the segmented block information (when full segmented block information cannot be stored) will be described as the second embodiment below. Note that the arrangement of the data processing apparatus 1, the configuration of clusters, and the like in the second embodiment are the same as those shown in FIG. 15 and FIGS. 1 and 2 in the first embodiment, and a description thereof will be omitted.

Figure 5A:
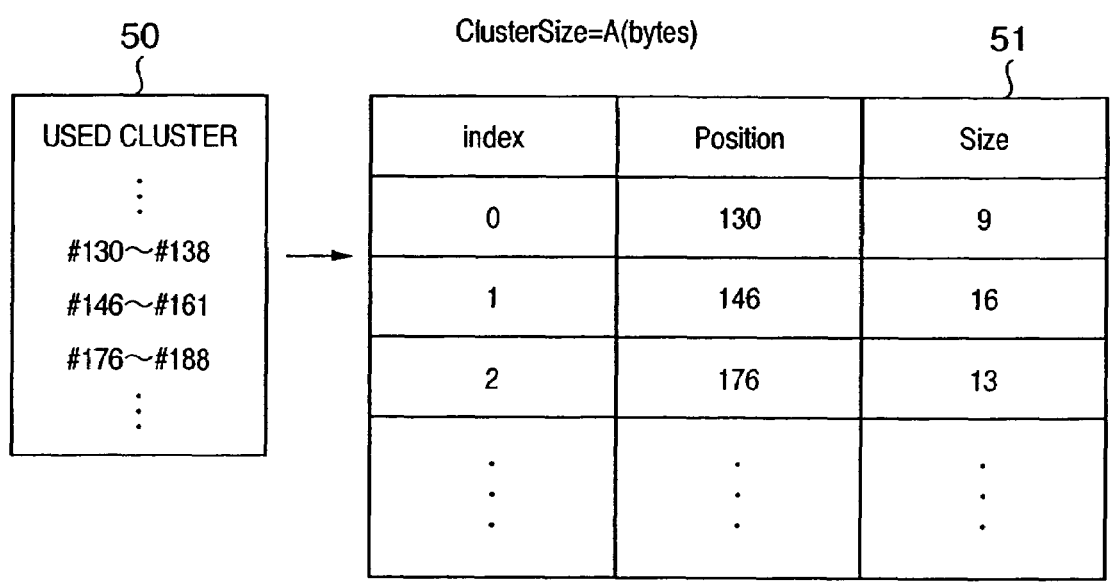
FIG. 5A shows a configuration example of segmented block information according to the second embodiment of the present invention.

FIG. 5A shows an example of segmented block information according to used clusters. When clusters #130 to #138, #146 to #161, #176 to #188, . . . are used, as shown in a used cluster state 50 in FIG. 5A, segmented block information 51 is constructed. Note that the information configuration of the segmented block information 51 is the same as the segmented block information 41 shown in FIG. 4A. As shown in the used cluster state 50 in FIG. 5A, the number of used clusters is larger than the used cluster state 40 shown in FIG. 4A. For this reason, the segmented block information cannot be fully stored in the storage area indicated by the segmented block information 51. Note that the number of used clusters included in all segmented blocks (segmented blocks formed by clusters with numbers smaller than those of the current segmented block information 51) located below segmented blocks stored in this segmented block information 51 is independently stored in the memory 5.

FIG. 5B is a view for explaining a program that implements a seek process using the segmented block information shown in FIG. 5A. The data processing apparatus 1 executes a process for seeking a requested position (FileOffset: indicating the data size from the head of a file to that position) in the file using the position information "Position" and size information "Size" shown in FIG. 5A as variables. Note that variable i in FIG. 5B is a variable indicating the value of the index number "index" of the segmented block information shown in FIG. 5A, and variable A is the data size of each cluster.

If the requested position (FileOffset) in the file is included in the currently assured segmented block information 51, the data processing apparatus 1 uses that information intact. If that information is not included in the segmented block information 51, the apparatus 1 executes a process for reconstructing the segmented block information 51 to include that FileOffset in the segmented block information 51 (an Info update process in FIG. 5B).

Figure 5C:
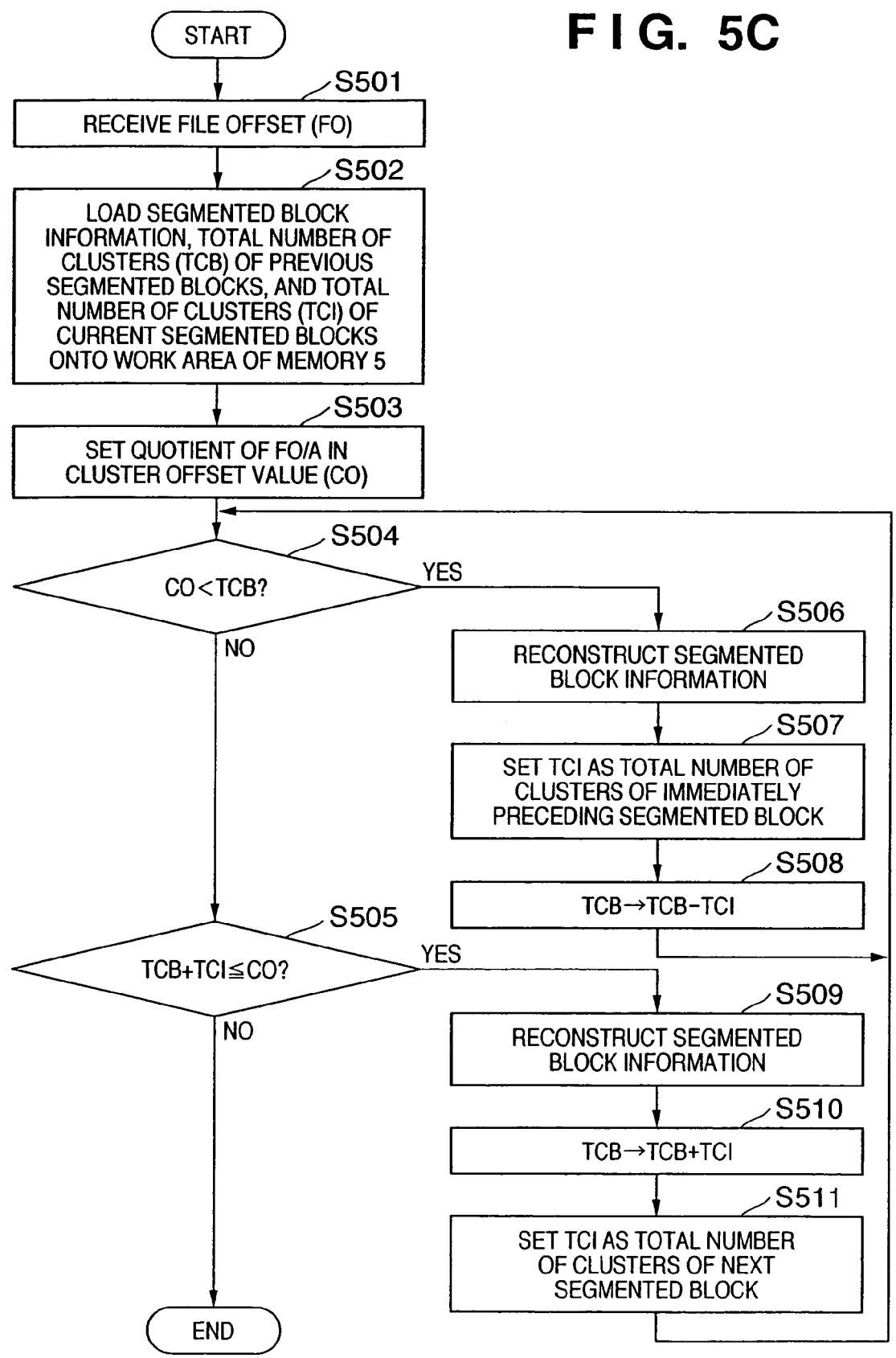
FIG. 5C is a flowchart of a reconstruction process of segmented block information according to the second embodiment of the present invention.

More specifically, the reconstruction process of the segmented block information 51 is executed according to the flowchart shown in FIG. 5C.

A file offset (FO) is accepted (S501). The segmented block information 51, the total number of clusters (the previous total number of clusters: TCB) of segmented blocks before those included in the segmented block information 51, and the total number of clusters (the current total number of clusters: TCI) included in the segmented block information 51 are loaded onto the work area of the memory 5 (S502). Next, the quotient (integer value) obtained by dividing the file offset by the data size: A per cluster is set in the value of a cluster offset (CO) (S503). Note that the cluster offset (CO) indicates a cluster position from the head that includes the requested position in a specific file to be sought.

The cluster offset (CO) is compared with the previous total number of clusters (TCB) (S504). If CO<TCB ("YES" in step S504), the flow advances to step S506 to reconstruct the segmented block information 51 so as to include one segmented block before those included in the current segmented block information 51. Furthermore, TCI is set as the total number of clusters of the segmented block information 51 reconstructed in step S506 (S507). The contents of TCB are updated by TCB−TCI (S508). After that, the flow returns to step S504 to continue the process.

On the other hand, if CO≧TCB ("NO" in step S504), it is checked if CO is equal to or larger than a size as the sum of TCB and TCI (S505). If TCB+TCI≦CO ("YES" in step S505), the flow advances to step S509 to reconstruct the segmented block information 51 so as to include one segmented block after those included in the current segmented block information 51. The contents of TCB are updated by TCB+TCI (S510). Furthermore, TCI is set as the total number of clusters of the segmented block information 51 reconstructed in step S509 (S511). After that, the flow returns to step S504 to continue the process.

If CO<TCB+TCI in step S505, TCB≦CO<TCB+TCI in combination with the checking result in step S504, and the currently assured segmented block information 51 shown in FIG. 5A includes the requested position (FileOffset) in the file.

The cluster number (variable StartCluster) corresponding to FileOffset in the specified segmented block and the offset position (variable StartOffset) in that cluster can be obtained by the same process as that in the flowchart shown in FIG. 4C. In this embodiment, however, since the segmented block information 51 does not include all used clusters that form the file, when the file offset value is set in the value of RemainOffset in step S403, the product of the previous total number of clusters (TCB) and the data size (A) per cluster must be subtracted from the file offset (FO).

With the above process, the data processing apparatus 1 can seek the requested position in the file without seeking used cluster information in turn. As a result, the apparatus need not seek the used cluster information in turn irrespective of the seek position, and the seek time can be shortened. That is, even when the storage area of the segmented block information 51 cannot be assured large enough to store the number of segmented blocks of the file, since the means for reconstructing the segmented block information 51 is provided, the requested position in the file can be sought while minimizing the operation for seeking the used cluster information in turn.

Third Embodiment

A seek method (third processing method) which can obviate the need for starting seek from the head of a file by setting seek start positions (or access start positions) at appropriate intervals even when the seek position is located before the current head position (reverse direction) will be described as the third embodiment below. Note that the arrangement of the data processing apparatus 1, the configuration of clusters, and the like in the third embodiment are the same as those shown in FIG. 15 and FIGS. 1 and 2 in the first embodiment, and a description thereof will be omitted.

Figure 6A:
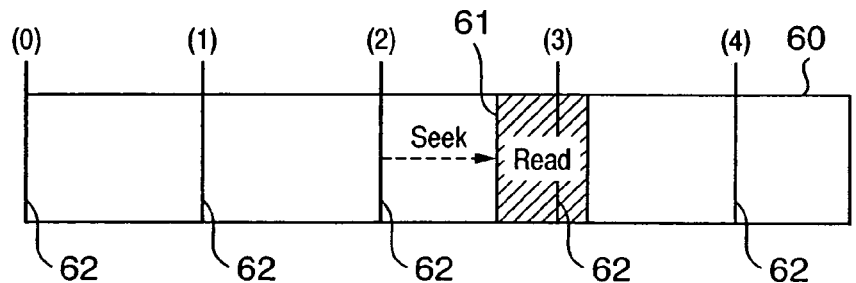
FIG. 6A shows an example of a seek method according to the third embodiment of the present invention.
Figure 6B:
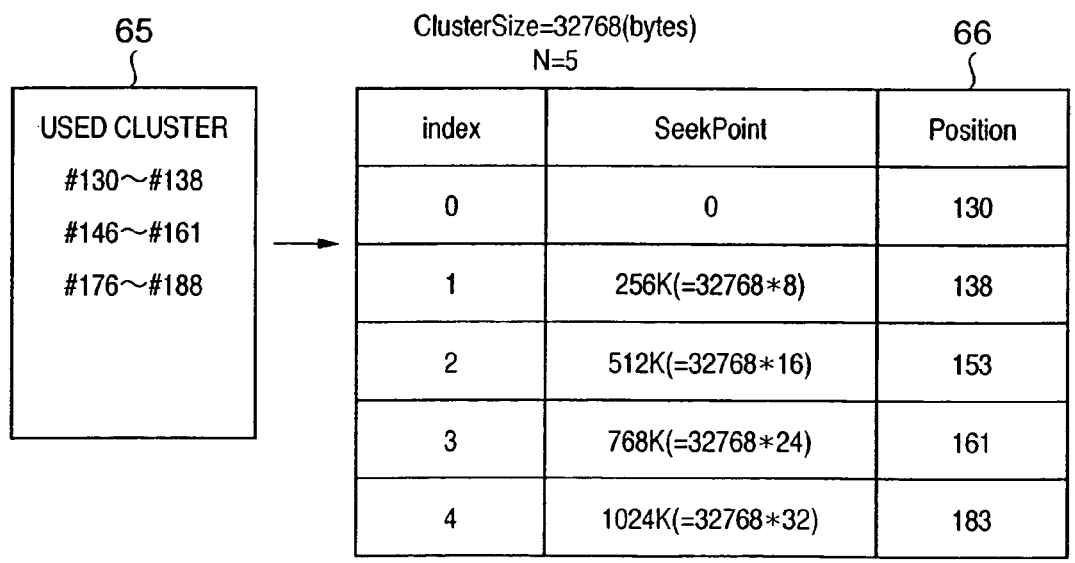
FIG. 6B shows an example of seek start position information according to the third embodiment of the present invention.

FIGS. 6A, 6B, and 6C are views for explaining the seek method of this embodiment. With this seek method, the need for restarting seek from the head of a file can be obviated by setting seek start positions at appropriate intervals even when the seek position is located before the current head position (reverse direction). In FIG. 6A, a cluster sequence 60 conceptually indicates a sequence of clusters on the storage unit 203. As shown in FIG. 6A, the data processing apparatus 1 sets five seek start positions 62 (with index numbers 0 to 4) to the cluster sequence 60 at appropriate intervals.

More specifically, when clusters #130 to #138, #146 to #161, and #176 to #188 are used, as shown in a used cluster state 65 in FIG. 6B, seek start position information (or access start position information) 66 is constructed. The seek start position information 66 stores the data size corresponding to each seek start position (corresponding to the data size from the head of the file to that seek start position) as position information "SeekPoint" that specifies each seek start position, and a cluster number corresponding to each seek start position as "Position" in association with an index number "index" ((0) to (4) in FIG. 6A) that identifies each seek start position. In this embodiment, the data size (ClusterSize) of each cluster is 32,768 (bytes), and the number of seek start position: N=5 is set.

As shown in the seek start position information 66 in FIG. 6B, the interval between neighboring seek start positions 62 is 256K (bytes). That is, if the head of the file is set as a first (index=0) seek start position 62(0), i.e., SeekPoint=0, a next (index=1) seek start position 62(1) is SeekPoint=256K, a seek start position 62(2) of index=2 is SeekPoint=512K, a seek start position 62(3) of index=3 is SeekPoint=768K, . . . . . In this embodiment, eight clusters are included between neighboring seek start positions so as to express 256K (bytes)=32, 768 (bytes)×8. Hence, "Position" in the seek start position information 66 is also 130, 138, 153, . . . .

In this embodiment, the seek start positions set at appropriate intervals are called "bookmarks". Each bookmark position can be calculated, e.g., by:

Each cluster interval (clusters)=(the total number of clusters+$N$−1)/$N$     (1)

where N is the number of bookmarks (seek start positions) to be set, as described above.

With equation (1) above, the number of clusters included between neighboring bookmarks can be calculated (drop fractions). In this embodiment, as shown in FIG. 6B, since the total number of clusters (the total number of used clusters) is 38 and N=5, (38+4)/5=8 (clusters) are included between neighboring bookmarks according to equation (1) above.

FIG. 6C is a view for explaining a program that implements a seek process by exploiting the seek start position information 66 shown in FIG. 6B. The data processing apparatus 1 executes a process for seeking a requested position (FileOffset: indicating the data size from the head of a file to that position) in a specific file using the seek start position "SeekPoint" and the cluster number "Position" corresponding to that position shown in FIG. 6B as variables. Note that variable index in FIG. 6C is a variable indicating the value of "index" as an identification number of each seek start position shown in FIG. 6B.

Figure 6D:
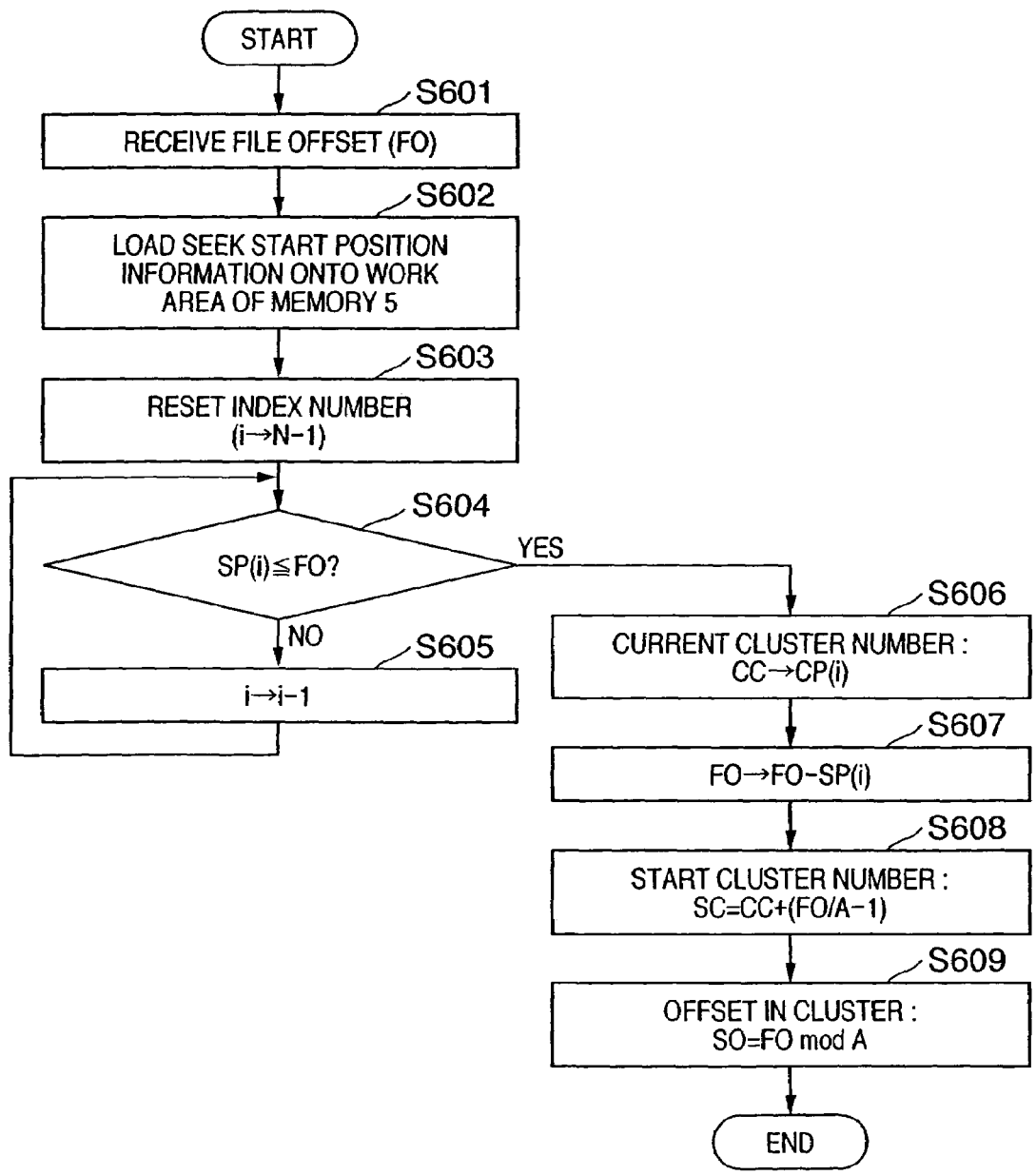
FIG. 6D is a flowchart of a seek process according to the third embodiment of the present invention.

More specifically, the seek process is executed according to the flowchart shown in FIG. 6D.

A file offset (FO) is accepted (S601). Next, the seek start position information 66 is loaded onto the work area of the memory 5 (S602). Furthermore, variable index is reset to N−1 (in the above case, 5−1=4) (S603). Also, the value of Seek-Point (SP(i)) corresponding to set variable index is compared with the file offset (FO) accepted in step S601 (S604).

If SP(i)>FO ("NO" in step S604), since the requested seek position is located before the corresponding "bookmark", variable index is decremented by "−1" (S605), and the value of SP(i) corresponding to the immediately preceding "bookmark" is compared with FO again (S604). In this manner, when the previously located "bookmark" is selected in turn, and the data size (SP(i)) to the selected "bookmark" is compared with the value of the file offset (FO), the magnitude relationship is reversed at some point in time ("YES" in step S604). At this time, the "bookmark" which is located before the requested position (specific position) in the file and is closest to that position is determined. Position (CP(i)) in the seek start position information 66 corresponding to variable index at that time is the cluster number (CC) corresponding to that "bookmark" (S606). For example, if variable index in FIG. 6A is "1", since CP(i) is "138", CC=138.

Since it is obvious that the requested position in the file is located after the start position of the cluster of interest, the requested position can be determined as follows. The data size (SP(i)) of SeekPoint corresponding to the cluster number (CC) is subtracted from the file offset value (FO) corresponding to the requested position (FO→FO−SP(i), S607). Next, the number (SC) of a start cluster to which the requested position belongs is determined by CC+(FO/A−1) (S608), and an offset (SO) in the start cluster is calculated as (FO mod A) (S609).

In this way, the requested position in the file can be specified.

With the aforementioned process, the data processing apparatus 1 can start seek from the seek start position closest to the requested position (FileOffset) in the file without seeking used cluster information in turn. In this manner, the apparatus need not seek used cluster information in turn from the head of the file irrespective of the seek position given by FileOffset, thus shortening the seek time. More specifically, since seek can be started from the middle of the file in place of the head irrespective of the seek position in the file, the seek process can be completed within a predetermined processing time.

Fourth Embodiment

Figure 7:
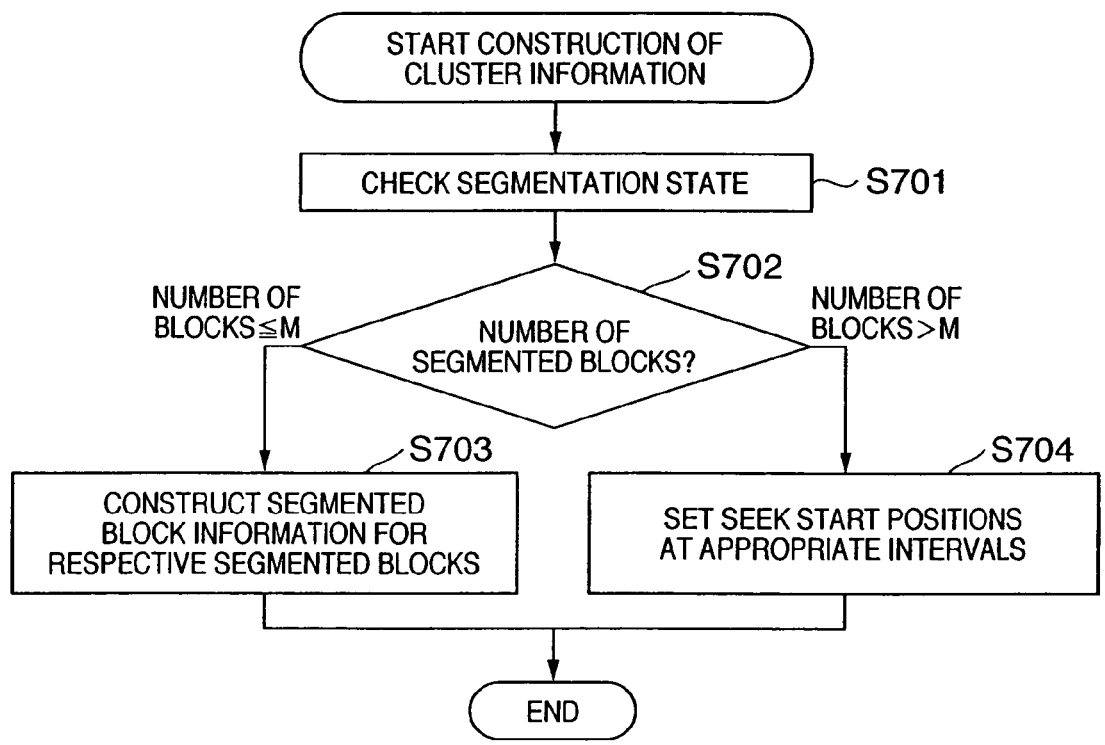
FIG. 7 is a flowchart showing an example of a seek method when the seek process is done by selecting an optimal one of the seek methods in the first to third embodiments, according to the fourth embodiment of the present invention.

A method of executing a seek process by selecting an optimal one of the first to third processing methods (seek methods) described with reference to FIGS. 4A to 6D in accordance with the segmentation state of a file will be described as the fourth embodiment below. Note that the arrangement of the data processing apparatus 1, the configuration of clusters, and the like in the fourth embodiment are the same as those shown in FIG. 15 and FIGS. 1 and 2 in the first embodiment, and a description thereof will be omitted. FIG. 7 is a flowchart corresponding to an example of a pre-process for executing one of the first to third processing methods (seek methods) described with using FIGS. 4A to 6D in accordance with the number of segmented blocks in a file.

Merits and demerits of the first to third processing methods explained with reference to FIGS. 4A to 6D will be explained. The first processing method explained using FIGS. 4A to 4C can expect high-speed access since used clusters need not be sought in turn. However, the size of an area for storing the segmented block information 41 is hardly predicted since it depends on the segmentation state (the number of segmented blocks) of the file.

The second processing method described using FIGS. 5A to 5C can be used more easily than the first processing method shown in FIGS. 4A to 4C since the upper limit of the storage area of the segmented block information 51 can be set. However, since the segmented block information must be reconstructed for segmented blocks which cannot be stored in the assured area, a seek process slows down.

The third processing method explained using FIGS. 6A to 6D can be used more easily than the first processing method since the seek start positions are set using the specific number of clusters as a unit, and an area used to assure the seek start position information can be set in advance. However, since the used cluster information 65 must be sought in turn from the specified seek start position every time seek is made, a longer seek time than the first processing method is often required.

Hence, this embodiment implements an optimal seek method utilizing the merits of each method by checking the file division state, i.e., file segmentation state, in the storage unit 203 first using the processing flow shown in FIG. 7. Upon forming cluster information (segmented block information), the data processing apparatus 1 checks the file segmentation state (step S701). If the total number of segmented blocks is equal to or smaller than a predetermined value M (natural number equal to or larger than 1) (the number of blocks<=M in step S702), the data processing apparatus 1 constructs segmented block information for respective segmented blocks (corresponding to the first and second processing methods) (step S703). On the other hand, if the number of segmented blocks is larger than M (the number of blocks>M in step S702), the data processing apparatus 1 sets seek start positions at appropriate intervals (corresponding to the third processing method) (step S704).

As described above, since an optimal one of the first to third processing methods is selected in accordance with the file segmentation state, the data processing apparatus 1 of this embodiment implements a high-speed seek process using the first or second processing method if the number of segmented blocks is not so large. On the other hand, the apparatus 1 applies the third processing method if the number of segmented blocks is large. Hence, even when the size of the area to be assured for the segmented block information is determined in advance, a seek process faster than the conventional method (although it is not faster than the first and second processing methods) can be implemented.

Fifth Embodiment

Figure 8:
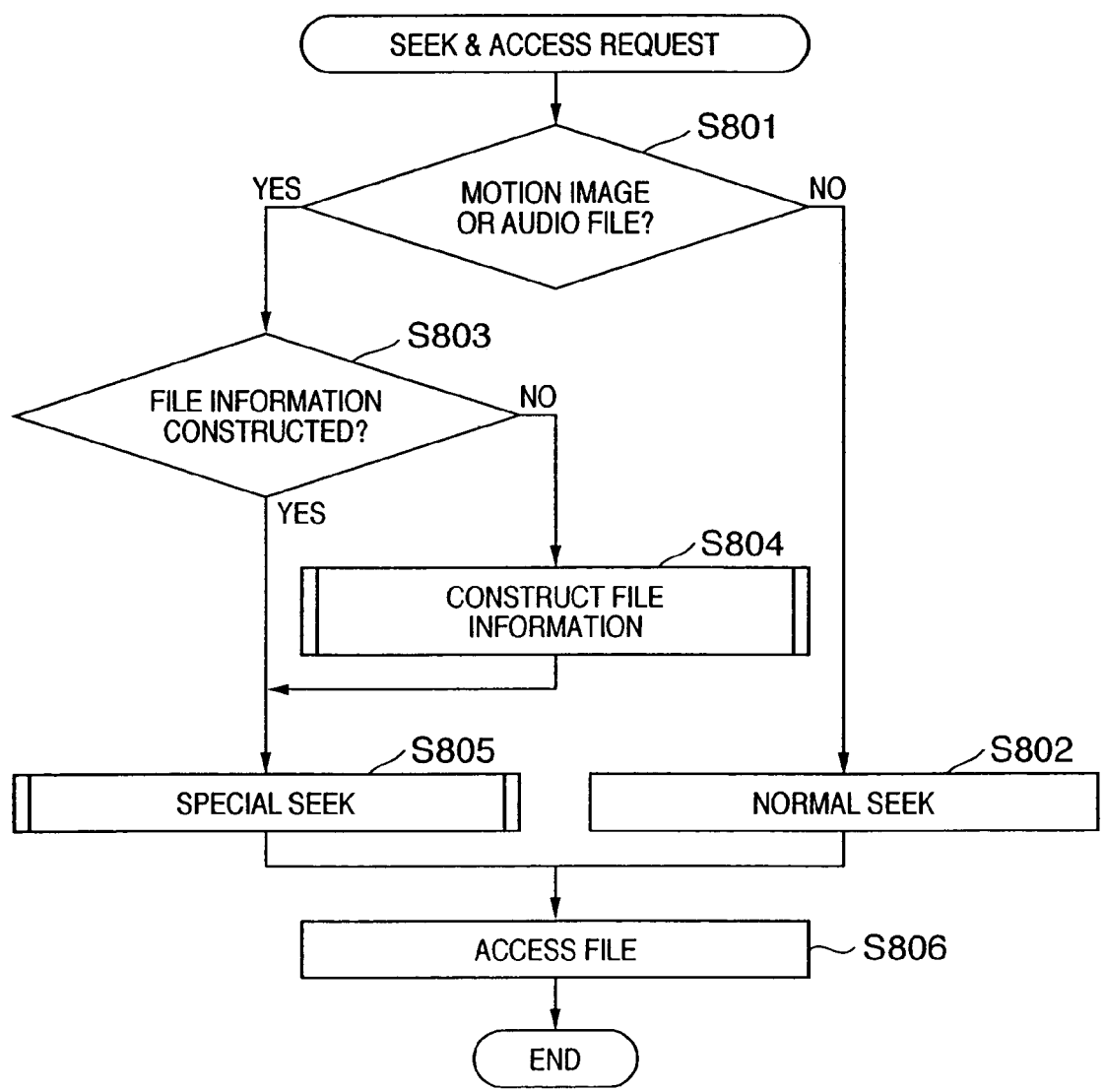
FIG. 8 is a flowchart of a process according to the fifth embodiment of the present invention.

A seek method that performs seek by a special process corresponding to the present invention for a file of a specific type will be explained as the fifth embodiment below. Note that the arrangement of the data processing apparatus 1, the configuration of clusters, and the like in the fifth embodiment are the same as those shown in FIG. 15 and FIGS. 1 and 2 in the first embodiment, and a description thereof will be omitted. FIG. 8 is a flowchart showing the seek method corresponding to this embodiment. Note that a file of a specific type corresponds to a file with a huge size such as a motion image file, audio file, and the like.

If a seek & access request to a file is generated, the data processing apparatus 1 checks if that file is a specific file (a motion image or audio file in this case) (step S801). If the file is not a specific file ("NO" in step S801), the data processing apparatus 1 executes a normal seek process shown in, e.g., FIGS. 3A and 3B (step S802), and the flow advances to step S806.

If the seek & access request to a specific file is generated ("YES" in step S801), the data processing apparatus 1 checks if the file information (=segmented block information or seek start position information) has already been constructed (step S803). If it is determined that the file information has not been generated or the file information is being constructed ("NO" in step S803), the data processing apparatus 1 constructs the file information (step S804), and the flow advances to step S805. If it is determined that the file information has already been constructed ("YES" in step S803), the data processing apparatus 1 executes one of the first to third processing methods mentioned above using the constructed file information (step S805), and the flow advances to step S806. In step S806, the data processing apparatus 1 accesses the file after seek.

If the file information is not constructed in step S803, the file information to be constructed may be selected in accordance with the number of segmented blocks, as shown in FIG. 7, and the selected file information may be constructed in step S804.

With the above process, even when random accesses are generated for a huge file like a motion image or audio file, the seek time can be shortened. In the aforementioned embodiment, if construction itself of the segmented block information becomes a heavy process, segmented block information need not be constructed for all segmented blocks of the file in step S804, and only segmented block information to undergo a requested seek process may be constructed. In this case, the total data size of clusters included in the segmented block information is calculated on the basis of the number of clusters included in the constructed segmented block information, and when the total data size becomes larger than the data size from the head of the file to the requested position, construction of the segmented block information may be completed.

As a result, by performing seek processes to respective positions of the file, the segmented block information approaches completion little by little.

Sixth Embodiment

Figure 9:
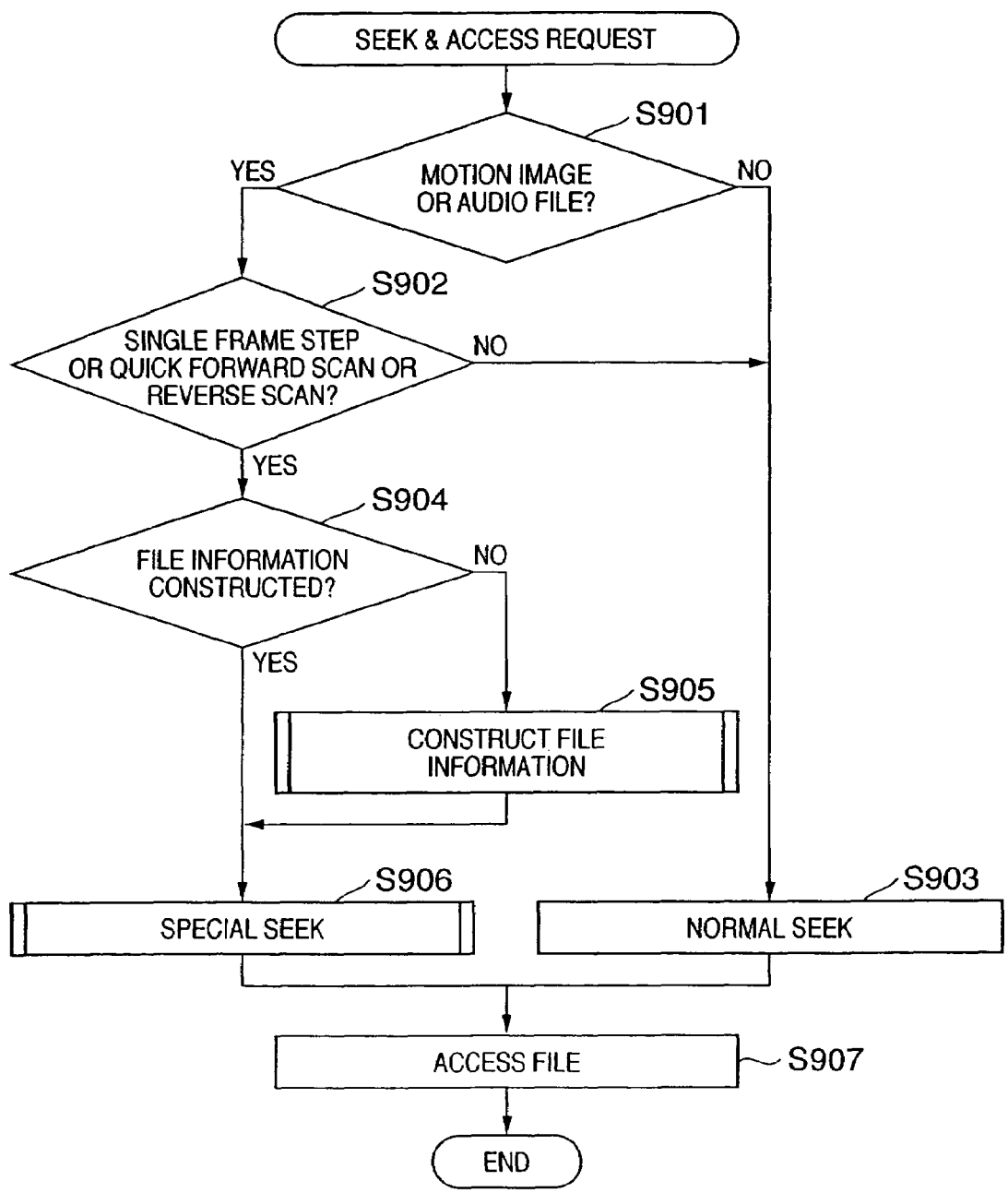
FIG. 9 is a flowchart of a process according to the sixth embodiment of the present invention.

A seek method that performs a special seek operation corresponding to the present invention in case of a specific operation will be described as the sixth embodiment below. Note that the arrangement of the data processing apparatus 1, the configuration of clusters, and the like in the sixth embodiment are the same as those shown in FIG. 15 and FIGS. 1 and 2 in the first embodiment, and a description thereof will be omitted. FIG. 9 is a flowchart of the process corresponding to this embodiment. Note that the specific operation is an operation that generates random accesses to a huge file, and for example, single frame step, quick forward scan, and reverse scan playback operations of a motion image or audio file will be exemplified below.

If a seek & access request to a file is generated, the data processing apparatus 1 checks if that file is a specific file (a motion image or audio file in this case) (step S901). If the file is not a specific file ("NO" in step S901), the data processing apparatus 1 executes a normal seek process shown in, e.g., FIGS. 3A and 3B (step S903), and the flow advances to step S907.

If the seek & access request to a specific file is generated ("YES" in step S901), the flow advances to step S902, and the data processing apparatus 1 checks if a specific operation (single frame step, forward scan, reverse scan in this case) is to be executed. If it is determined that the specific operation is not to be executed ("NO" in step S902), the flow advances to step S903, and the data processing apparatus 1 executes a normal seek process shown in, e.g., FIGS. 3A and 3B. If it is determined that the specific operation is to be executed ("YES" in step S902), the data processing apparatus 1 checks if the file information (=segmented block information or seek start position information) has already been constructed (step S904).

If it is determined that the file information has not been generated or the file information is being constructed ("NO" in step S904), the data processing apparatus 1 constructs the file information (step S905), and the flow advances to step S906. If it is determined that the file information has already been constructed ("YES" in step S904), the data processing apparatus 1 executes the seek process of the present invention corresponding to one of the first to third processing methods mentioned above in correspondence with the type of the constructed file information (step S906), and the flow advances to step S907. In step S907, the data processing apparatus 1 accesses the file after seek.

If the file information is not constructed in step S904, the file information to be constructed may be selected in accordance with the number of segmented blocks, as shown in FIG. 7, and the selected file information may be constructed in step S905.

With the above process, the seek time in the single frame step, quick forward scan, and reverse scan playback operations of a motion image or audio file, which often generate random accesses to a huge file can be shortened. In the aforementioned embodiment, if construction itself of the segmented block information becomes a heavy process, segmented block information need not be constructed for all segmented blocks of the file in step S905, and only segmented block information to undergo a requested seek process may be constructed. A practical method for such process is as has been described in the fifth embodiment. In this case, by performing seek processes to respective positions of the file, the segmented block information approaches completion little by little.

Seventh Embodiment

Figure 10:
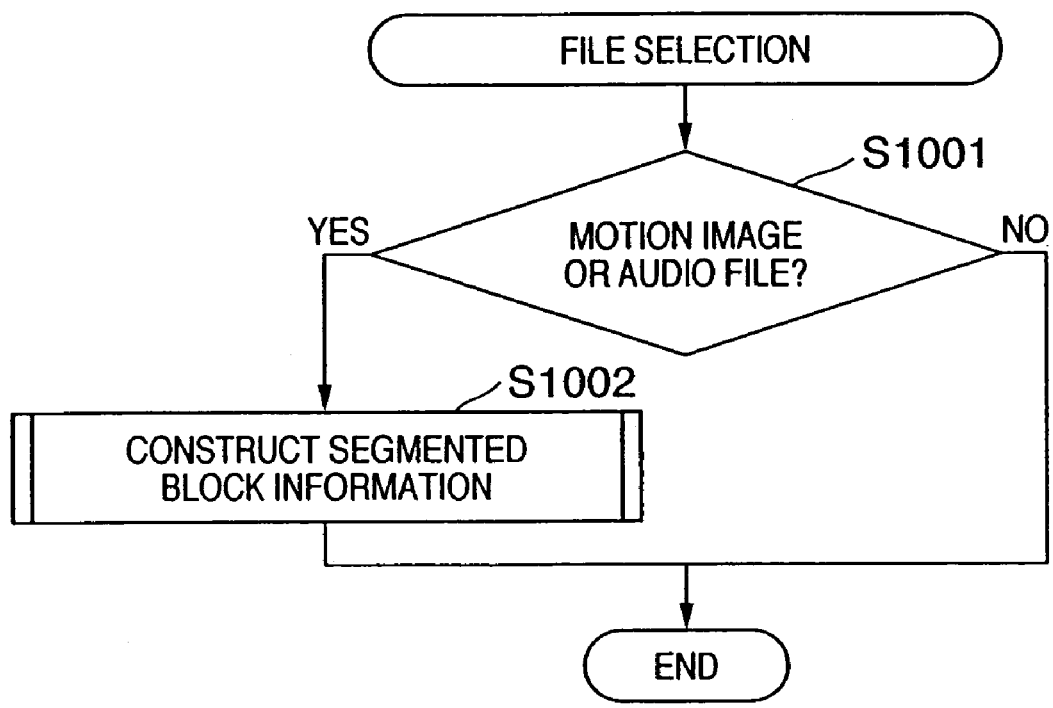
FIG. 10 is a flowchart of a process according to the seventh embodiment of the present invention.

A method of constructing segmented block information of a file selected by the user will be explained as the seventh embodiment below. Note that the arrangement of the data processing apparatus 1, the configuration of clusters, and the like in the seventh embodiment are the same as those shown in FIG. 15 and FIGS. 1 and 2 in the first embodiment, and a description thereof will be omitted. FIG. 10 is a flowchart showing a method of constructing segmented block information of a file selected by the user.

When the construction process of segmented block information becomes heavy due to a huge file, the segmented block information is preferably constructed when the user selects a given file in place of constructing segmented block information in turn for all files stored in the storage unit 203, thus reducing the stress on the user. As a file which has a huge data size and generates random accesses, a motion image or audio file will be exemplified. Alternatively, segmented block information may be constructed for all selected files.

As shown in FIG. 10, the data processing apparatus 1 checks the type of a file selected by the user of those stored in the storage unit 203 (step S1001). If the file type is a motion image or audio file (YES in step S1001), the data processing apparatus 1 constructs segmented block information (step S1002). If the file type is not a motion image or audio file (NO in step S1001), the data processing apparatus 1 ends the process.

Eighth Embodiment

Figure 12:
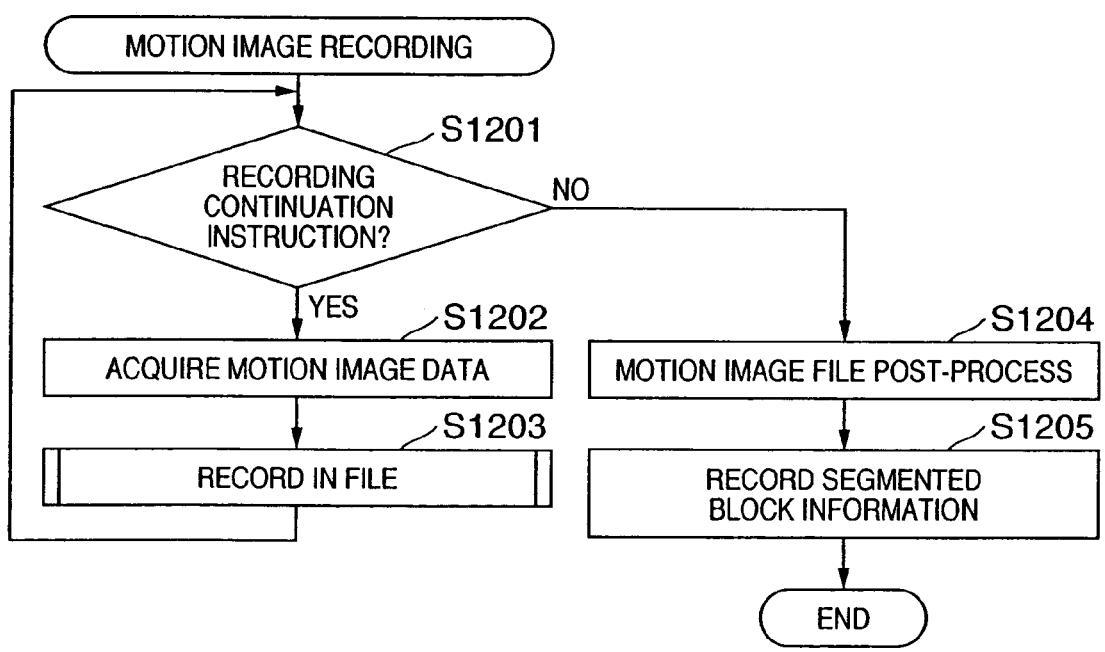
FIG. 12 is a flowchart of a process according to the eighth embodiment of the present invention.

A method of constructing segmented block information during motion image recording in the data processing apparatus 1 which can record a motion image will be described as the eighth embodiment below. Note that the arrangement of the data processing apparatus 1, the configuration of clusters, and the like in the eighth embodiment are the same as those shown in FIG. 15 and FIGS. 1 and 2 in the first embodiment, and a description thereof will be omitted. FIG. 12 is a flowchart showing a method of constructing segmented block information during motion image recording in the data processing apparatus 1 which can record a motion image.

As shown in FIG. 12, when a motion image recording instruction is issued, the data processing apparatus 1 checks if a continuation instruction of motion image recording is issued (step S1201). Note that the motion image recording instruction is issued based on the operation of a video recording button provided to the main body of the data processing apparatus 1, and whether or the continuation instruction of motion image recording is issued can be determined by checking if the operation of the video recording button is canceled by a stop button or the like. If the continuation instruction of motion image recording is issued ("YES" in step S1201), the data processing apparatus 1 acquires motion image data in the volatile memory (memory 5) (step S1202). The data processing apparatus 1 writes the motion image data acquired on the memory 5 in a file on the non-volatile memory (storage medium 200) (step S1203).

Figure 11:
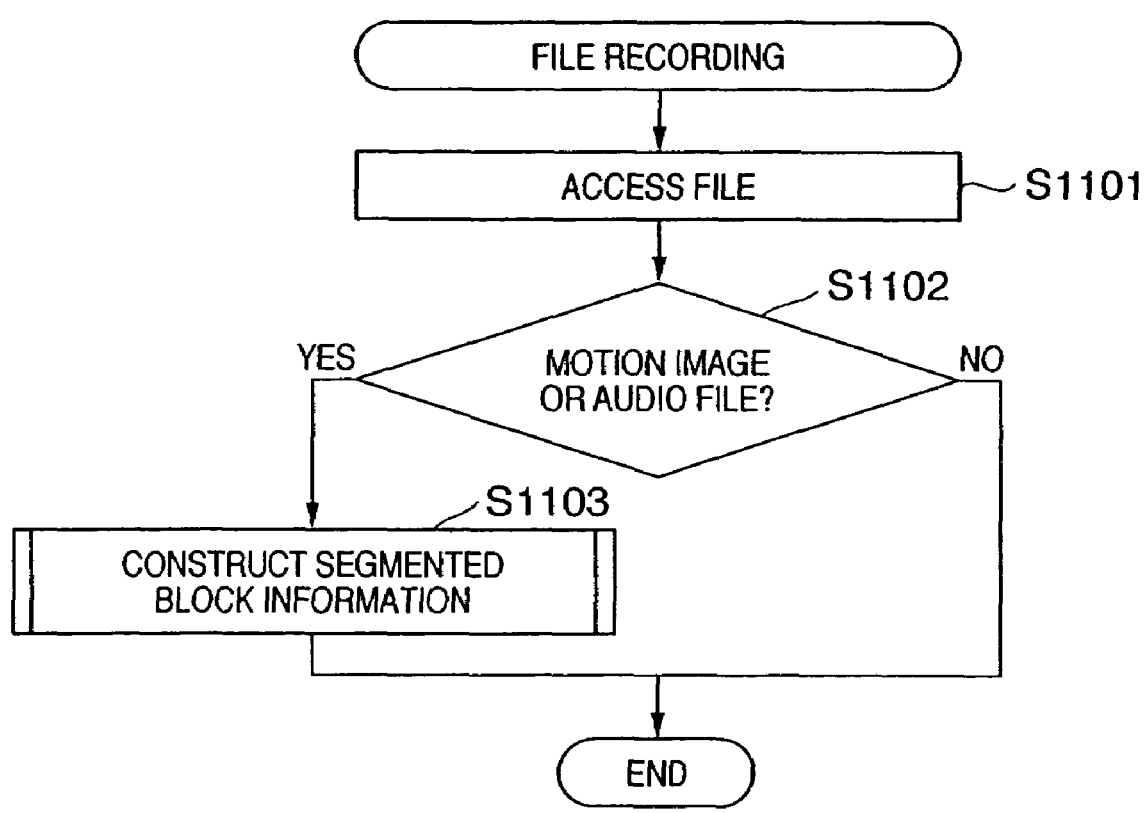
FIG. 11 is a flowchart of a write process in a storage medium 200 according to the eighth embodiment of the present invention.

Details of the write operation in the storage medium 200 in step S1203 will be described below. FIG. 11 is a flowchart showing details of the write operation in the storage medium 200 in step S1203 shown in FIG. 12. As shown in FIG. 11, the data processing apparatus 1 writes data to be written in a file on the storage medium 200 (step S1101). The data processing apparatus 1 then checks if the file that has undergone the write process on the storage medium 200 is a motion image or audio file (step S1102). If it is determined that the file is a motion image or audio file (YES in step S1102), the data processing apparatus 1 constructs segmented block information on the memory 5 (step S1103).

Referring back to FIG. 12, if no continuation instruction of motion image recording is issued (NO in step S1201), the data processing apparatus 1 performs a post-process of a motion image file (e.g., recording of the capture time and the like) (step S1204). The data processing apparatus records the segmented block information on the memory 5 on the storage medium 200 as a file independent from the motion image file (step S1205). In this way, the data processing apparatus 1 ends a motion image recording process.

In the above embodiment, the segmented block information is recorded on the storage medium 200 as a file independent from the motion image file. However, the recording method is not limited to this. For example, the segmented block information may be saved in the motion image file as an attached file, may be recorded in the internal non-volatile memory 9, or may be left on the memory 5 intact (it is deleted upon power OFF).

When the motion image file recorded by the aforementioned process is to be played back, if a medium (storage medium 200) to be sought by the seek method shown in FIG. 8 or 9 is not exchanged, it is determined in step S803 (FIG. 8) or step S904 (FIG. 9) that the file information has already been constructed, and the segmented block information recorded on the storage medium 200 can be used. Whether or not the storage medium 200 is exchanged can be determined using the detector 12 if the storage medium 200 is detached/attached from when the motion image file is recorded on the storage medium 200 until that motion image file is played back.

Ninth Embodiment

Figure 13:
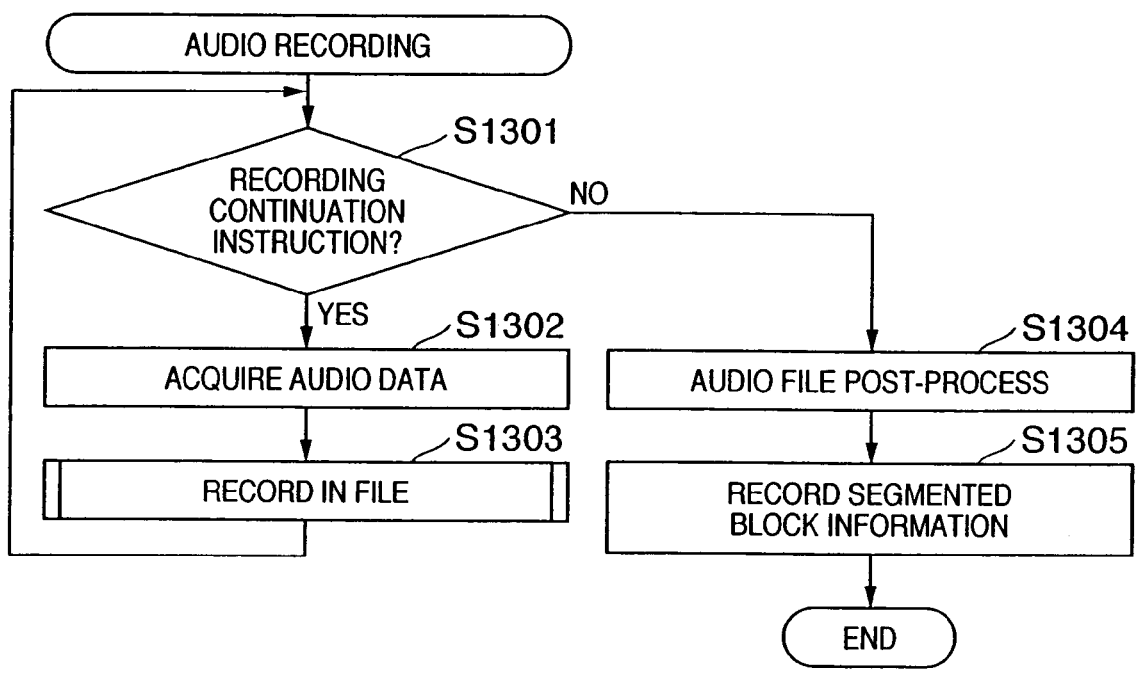
FIG. 13 is a flowchart of a process according to the ninth embodiment of the present invention.

A method of constructing segmented block information during recording of audio data in the data processing apparatus 1 that can perform audio recording will be described as the ninth embodiment below. Note that the arrangement of the data processing apparatus 1, the configuration of clusters, and the like in the ninth embodiment are the same as those shown in FIG. 15 and FIGS. 1 and 2 in the first embodiment, and a description thereof will be omitted. FIG. 13 is a flowchart showing a method of constructing segmented block information during recording of audio data in the data processing apparatus 1 which can perform audio recording.

As shown in FIG. 13, when an audio recording instruction is issued, the data processing apparatus 1 checks if a continuation instruction of audio recording is issued (step S1301). Note that the audio recording instruction is issued based on the operation of an audio recording button provided to the main body of the data processing apparatus 1, and whether or the continuation instruction of audio recording is issued can be determined by checking if the operation of the audio recording button is canceled by a stop button or the like. If the continuation instruction of audio recording is issued (YES in step S1301), the data processing apparatus 1 acquires audio data in the volatile memory (memory 5) (step S1302). The data processing apparatus 1 writes the audio data acquired on the memory 5 in a file on the non-volatile memory (storage medium 200) (step S1303).

Details of the write operation in the storage medium 200 in step S1303 will be described below. Details of the write operation in the storage medium 200 in step S1303 in FIG. 13 are performed in the flow shown in FIG. 11 as in the case of a motion image. As shown in FIG. 11, the data processing apparatus 1 writes audio data to be written in a file on the storage medium 200 (step S1101). The data processing apparatus 1 then checks if the file that has undergone the write process on the storage medium 200 is a motion image or audio file (step S1102). If it is determined that the file is an audio file (YES in step S1102), the data processing apparatus 1 constructs segmented block information on the memory 5 (step S1103).

If no continuation instruction of audio recording is issued (NO in step S1301), the data processing apparatus 1 performs a post-process of an audio file (e.g., recording of the capture time and the like) (step S1304). The data processing apparatus records the segmented block information on the memory 5 on the storage medium 200 as a file independent from the audio file (step S1305). In this way, the data processing apparatus 1 ends an audio recording process.

In the above embodiment, the segmented block information is recorded on the storage medium 200 as a file independent from the audio file. However, the recording method is not limited to this. For example, the segmented block information may be saved in the audio file as an attached file, may be recorded in the internal non-volatile memory 9, or may be left on the memory 5 intact (it is deleted upon power OFF).

When the audio file recorded by the aforementioned process is to be played back, if a medium (storage medium 200) to be sought by the seek method shown in FIG. 8 or 9 is not exchanged, it is determined in step S803 (FIG. 8) or step S904 (FIG. 9) that the file information has already been constructed, and the segmented block information recorded on the storage medium 200 can be used.

10th Embodiment

Figure 14:
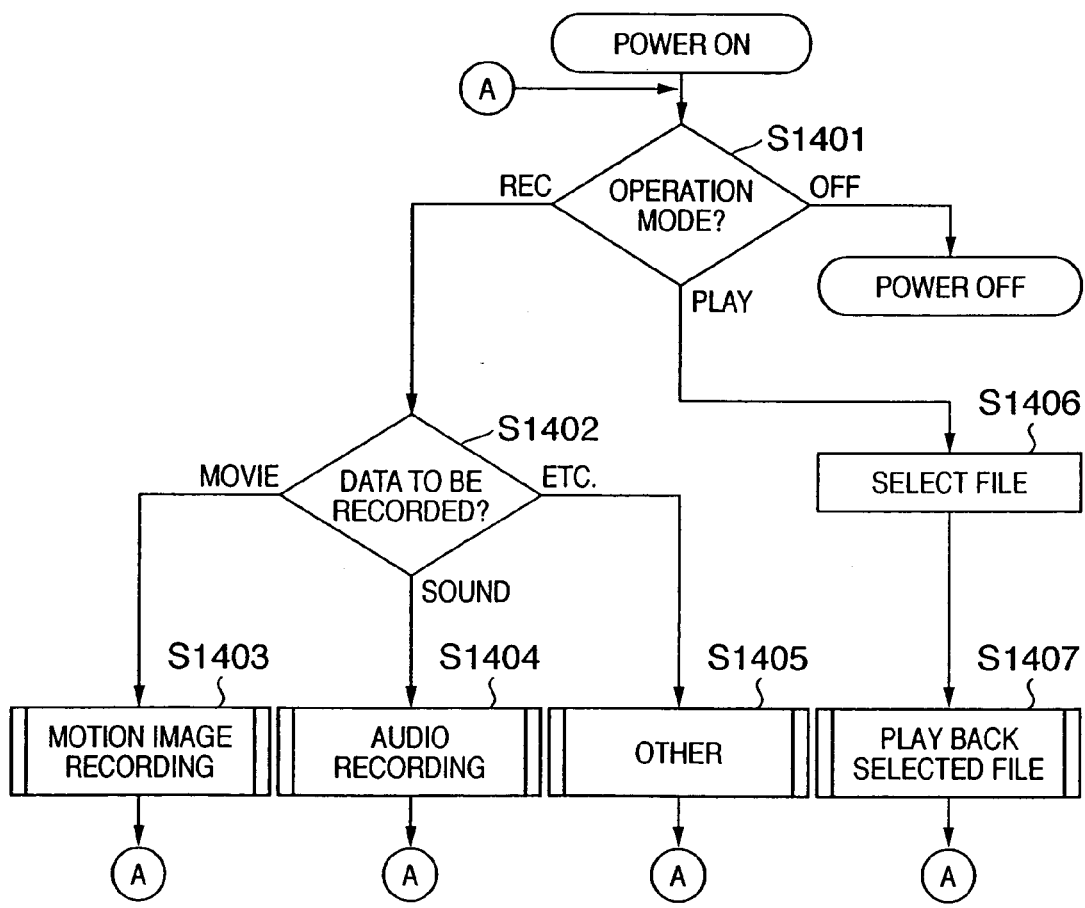
FIG. 14 is a flowchart of a process according to the 10th embodiment of the present invention.

A method of selectively using the aforementioned embodiments in accordance with an operation mode and the like as the data processing apparatus 1 of the 10th embodiment will be described below. Note that the arrangement of the data processing apparatus 1, the configuration of clusters, and the like in the 10th embodiment are the same as those shown in FIG. 15 and FIGS. 1 and 2 in the first embodiment, and a description thereof will be omitted. FIG. 14 is a flowchart showing the operation of the data processing apparatus 1 of the 10th embodiment.

As shown in FIG. 14, after power ON, the data processing apparatus 1 checks the operation mode (step S1401). If it is determined that the operation mode is a recording mode ("REC" in step S1401), the data processing apparatus 1 checks the type of data (data to be recorded) to be recorded on the storage medium 200 (step S1402). If the data to be recorded is a motion image file ("MOVIE" in step S1402), the data processing apparatus 1 performs motion image recording by the motion image recording process shown in, e.g., FIG. 12 (step S1403).

If the data to be recorded is an audio file ("SOUND" in step S1402), the data processing apparatus 1 performs audio recording by the audio recording process shown in, e.g., FIG. 13 (step S1404). If the data to be recorded is a file of another type ("ETC" in step S1402), the data processing apparatus 1 executes a process for that file (step S1405).

If it is determined in step S1401 that the operation mode is a playback mode ("PLAY" in step S1401), the data processing apparatus 1 performs a selection process of a file (a motion image file, audio file, or the like) to be played back in accordance with a user operation (step S1406). The data processing apparatus 1 performs a playback process of the selected file (step S1407). Note that the playback process in step S1407 preferably uses one of the playback processes shown in FIGS. 4A to 10 described above.

Note that the storage medium 200 shown in FIG. 15 is not limited to a memory card (PCMCIA card or the like), hard disk, or the like, but may use a micro DAT, a magnetooptical disk, an optical disk such as CD-R, CD-WR, or the like, a phase change optical disk such as DVD, or the like. Furthermore, the storage medium 200 may use a composite medium that integrates a memory card, hard disk, and the like, and an arbitrary medium may be detachable from that composite medium.

The method shown in any of FIGS. 4A to 7 may be used as a special seek method. Furthermore, a special seek method may be used in case of a specific file shown in FIG. 8, or a special seek method may be used in case of a specific operation shown in FIG. 9. A special seek method may be used using segmented block information recorded upon creation of a file shown in FIG. 12 or 13.

In the 10th embodiment shown in FIG. 14, the data processing apparatus 1 that can perform motion image recording and audio recording has been exemplified. However, the present invention is not limited to such specific apparatus, but may be applied to a playback-only data processing apparatus 1. In this case, a process without a recording mode is performed.

As described above, according to the information processing apparatus, information processing method, and program of the present invention, a seek time required to read out (access) data from information data (file) recorded on a storage medium can be shortened.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application Nos. 2004-015945 filed on Jan. 23, 2004 and 2005-009238 filed on Jan. 17, 2005, which are hereby incorporated by references herein.

What is claimed is:

1. An information processing apparatus for processing a series of information data divisionally recorded in a plurality of continuous areas on a storage medium which are discontinuous with each other, said apparatus comprising: an acquisition unit for acquiring division information associated with a division state of the recorded information data by the plurality of continuous areas on the storage medium; a generation unit for generating one of first management information that includes head position information indicating a head position of each continuous area on the storage medium and size information indicating a size of each continuous area on the storage medium, and second management information that associates a plurality of predetermined access start positions in the information data with positions on the storage medium wherein the information data corresponding to the plurality of predetermined access start positions is recorded in accordance with the division information acquired by said acquisition unit; a storage unit for storing the first management information or the second management information generated by said generation unit; a position information specifying unit for detecting a position on the storage medium where the information data of a specific position in the information data is recorded with reference to the first management information stored in said storage unit, and for specifying the detected position as a read position, wherein said position is detected when said storage unit stores the first management information in response to a data read request of reading the information data from the specific position, and for detecting a position corresponding to the access start position located before the specific position and closest to the specific position with reference to the second management information, seeking a position on the storage medium of the information data corresponding to the specific position from the detected position corresponding to the access start position, and for specifying the sought position as a read position, wherein said position corresponding to the access start position is detected when said storage unit stores the second management information in response to a data read request of reading the information data from the specific position; and from a data read unit for reading out the information data from the read position on the storage medium specified by said position information specifying unit.

2. The apparatus according to claim 1, further comprising a playback data processing unit for processing data read out by said data read unit, wherein when said generation unit generates the continuous area management information or the management information for some of the information data, said generation unit generates the continuous area management information or the management information for some of the information data to be used by said data read unit during a playback process of said playback data processing unit.

3. The apparatus according to claim 1, further comprising:
a information data generation unit for generating the information data; and
a recording unit for recording the information data generated by said information data generation unit on the storage medium, wherein said generation unit generates the first management information or the second management information for the information data recorded on the storage medium by said recording unit.

4. The apparatus according to claim 3, wherein the storage medium is exchangeable from said information processing apparatus via a mount mechanism, wherein said apparatus further comprises a detection unit for detecting whether or not the storage medium is exchanged from said information processing apparatus from the time when said recording unit records the information data on the storage medium until the read request is issued, and wherein when said detection unit detects that the storage medium is not exchanged, said data read unit reads out data from the storage medium using the first management information or the second management information generated by said generation unit for the information data recorded on the storage medium by said recording unit.

5. An information processing method using an information processing apparatus which can access a storage medium that divisionally records a series of information data in a plurality of continuous areas on the storage medium, wherein the plurality of continuous areas are discontinuous with each other, said method comprising: an acquisition step of acquiring division information associated with a division state of the recorded information data by the plurality of continuous areas on the storage medium; a generation step of generating one of first management information that includes head position information indicating a head position of each continuous area on the storage medium and size information indicating a size of each continuous area on the storage medium, and second management information that associates a plurality of predetermined access start positions in the information data with positions on the storage medium wherein the information data corresponding to the plurality of predetermined access start positions is recorded in accordance with the division information acquired in the acquisition step; a position information specifying step of detecting a position on the storage medium where information data of a specific position in the information data is recorded with reference to the first management information stored in the storage unit, and of specifying the detected position as a read position, wherein the position is detected when the first management information is generated in the generation step in response to a data read request of reading the information data from the specific position, and of detecting a position corresponding to the access start position located before the specific position and closest to the specific position with reference to the second management information, seeking a position on the storage medium where the information data corresponding to the specific position from the detected position corresponding to the access start position, and specifying the sought position as a read position, wherein the position corresponding to the access start position is detected when the storage unit stores the second management information in response to a data read request of reading the information data from the specific position; and a data read step of reading out the information data from the read position on the storage medium specified in the position information specifying step.

6. A program for making a computer execute as an information processing apparatus which can access a storage medium that divisionally records a series of information data in a plurality of continuous areas on the storage medium which are discontinuous with each other, comprising: an acquisition step of acquiring division information associated with a division state of the recorded information data by the plurality of continuous areas on the storage medium; a generation step of generating one of first management information that includes head position information indicating a head position of each continuous area on the storage medium and size information indicating a size of each continuous area on the storage medium, and second management information that associates access start position information which defines a plurality of predetermined access start positions in the information data with positions on the storage medium wherein the information data corresponding to the plurality of predetermined access start positions is recorded in accordance with the division information acquired in the acquisition step; a position information specifying step of detecting a position on the storage medium where information data of a specific position in the information data is recorded with reference to the first management information stored in the storage unit, and of specifying the detected position as a read position, wherein the position is detected when the first management information is generated in the generation step in response to a data read request of reading the information data from the specific position, and of detecting the position corresponding to the access start position located before the specific position and closest to the specific position with reference to the second management information, seeking a position on the storage medium where the information data corresponding to the specific position from the detected position corresponding to the access start position, and for specifying the sought position as a read position, wherein the position corresponding to the access start position is detected when the storage unit stores the second management information in response to a data read request of reading the information data from the specific position; and a data read step of reading out the information data from the read position on the storage medium specified in the position information specifying step.

* * * * *

UNITED STATES PATENT AND TRADEMARK OFFICE
CERTIFICATE OF CORRECTION

PATENT NO. : 7,409,399 B2  Page 1 of 1
APPLICATION NO. : 11/038114
DATED : August 5, 2008
INVENTOR(S) : Toshihiro Miyamoto It is certified that error appears in the above-identified patent and that said Letters Patent is hereby corrected as shown below:

COLUMN 16:
Line 51, "from a" should read -- a --.

Signed and Sealed this

Thirtieth Day of December, 2008

JON W. DUDAS
*Director of the United States Patent and Trademark Office*